Sept. 29, 1970

R. W. TURNER, JR 3,530,992

ROTARY DRUM FILTER

Filed Feb. 5, 1969

INVENTOR
RALPH W. TURNER JR.
BY
Robert R. Paquin
ATTORNEY

United States Patent Office 3,530,992
Patented Sept. 29, 1970

3,530,992
ROTARY DRUM FILTER
Ralph W. Turner, Jr., Nashua, N.H., assignor to Improved Machinery Inc., Nashua, N.H., a corporation of Delaware
Filed Feb. 5, 1969, Ser. No. 796,700
Int. Cl. B01d 35/12
U.S. Cl. 210—392  9 Claims

ABSTRACT OF THE DISCLOSURE

A rotary drum filter comprising a rotatable drum having generally longitudinally extending filtrate compartments along its periphery. The filtrate compartments include juxtaposed open ends; and the filter has a rotary filter cycle including an arcuate portion during which subatmospheric pressure is applied through such open ends to the compartments for filter cake accretion and an arcuate portion during which the subatmospheric pressure is cut off from the compartments. The application of the subatmosheric pressure is controlled by a nonrotatable or stationary valving assembly which includes plate elements resiliently biased into sliding engagement with the drum at the open ends of the filtrate compartments.

BACKGROUND OF THE INVENTION

The present invention relates to filtering apparatus and more particularly to rotary drum filters of the type for filtering a slurry such as, for example, pulp stock for the manufacture of paper.

Conventionally, rotary drum filters of this type frequently comprise a generally cylindrical, rotatably driven drum provided with a circumferential filter screen and having generally longitudinally extending filtrate compartments inwardly of the filter screen. During the operation of such a filter, a subatmospheric pressure or vacuum is created in each of the filtrate compartments during a portion of the filter cycle for facilitating filter cake accretion on the screen; and the subatmospheric pressure or vacuum is cut off during another portion of the cycle for permitting filter cake to be removed from the screen. The subatmospheric pressure is generally created by a single barometric leg; and the supply and cutoff of the subatmospheric pressure is controlled by a nonrotatable valving assembly which may be located adjacent an end of the drum, but which preferably is of the type described in U.S. Pats. No. 3,327,862 and 3,327,863 and located generally centrally of the drum.

This type of filter, although generally satisfactory in operation, has been found to be subject to the disadvantage that the barometric leg can only successfully handle a limited quantity of air; and, hence, air flow through the filtrate compartments into the barometric leg can seriously impair the operation of the filter. Moreover, it has been found that in conventional filters of this type air leakage at the valving assembly during removal of the filter cake and around the time of initial submergence is sufficiently great to seriously adversely affect the operation of the barometric leg and, resultantly, adversely affect the efficiency of the filter.

SUMMARY OF THE INVENTION

An object of the present invention is to provide a new and improved rotary drum filter which is particularly constructed and arranged to prevent air leakage from the filtrate compartments to a vacuum applying apparatus such as a barometric leg at the valving assembly.

Another object of the invention is to provide a new and improved rotary drum filter of the type set forth which is particularly constructed and arranged such that air leakage at the valving assembly is prevented in a relatively simple, efficient, and economical manner.

In general, these objects are attained by the construction of a rotary drum filter to comprise a rotatable drum having peripheral filtrate compartments which extend generally longitudinally of the drum and co-operate to form an annular volume peripherally therearound, such filtrate compartments having open ends (arranged to form a band of the open ends peripherally around the drum) through which the subatmospheric pressure is applied to the compartments and through which filtrate is drained from the compartments. Stationary means held against rotation are provided for controlling the application of subatmospheric pressure to the compartments through the open ends, such stationary means including wall means having a side for slidably engaging the drum at said open ends during the portion of the filter cycle in which the subatmospheric pressure is cut off and such side of the wall means being resiliently caused to slidably engage the drum.

BRIEF DESCRIPTION OF THE DRAWING

Referring to the drawings.

DESCRIPTION OF THE PREFERRED EMBODIMENT

Figure 1:
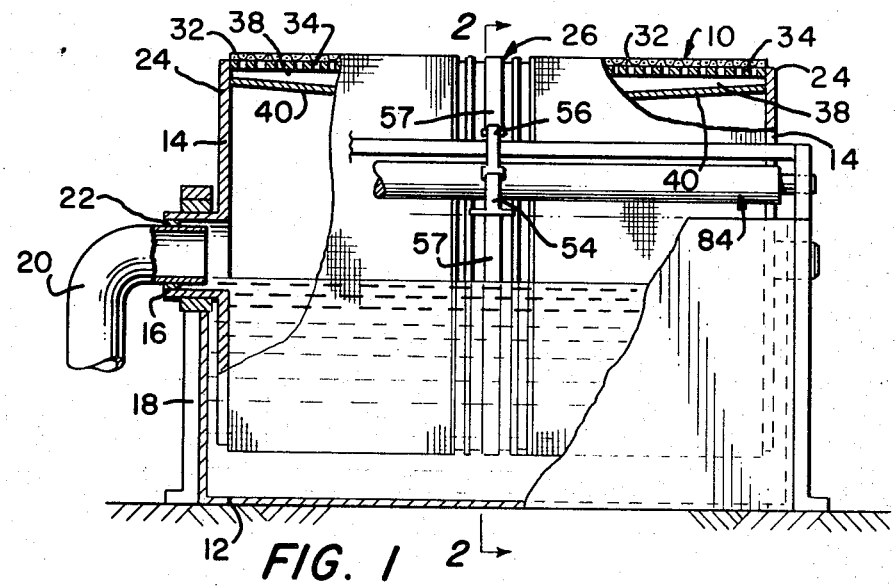
FIG. 1 is an elevational side view, partially broken away and in section, of a rotary drum filter constructed in accordance with the present invention.

Referring more particularly to the drawings wherein similar reference characters designate corresponding parts throughout the several views, FIGS. 1 through 4 illustrate a rotary drum filter which, generally considered, is of the type described in the aforementioned U.S. Pat. No. 3,327,863. The drum filter comprises a rotatably driven drum designated generally as 10 which is partially submerged in a tank or vat 12 containing a slurry including pulp fibers. The drum 10 is formed to include a pair of end closure plates 14 each having mounted thereon a trunnion 16 serving to rotatably support the drum 10 on a bearing support 18. One of the trunnions 16 is hollow and has the upper end of a barometric leg or vacuum pipe 20 extending thereinto. A suitable annular seal 22 is disposed intermediate the inner circumference of such trunnion 16 and the outer circumference of the barometric leg 20 to seal the space therebetween while permitting rotation of the drum 10 relative to the barometric leg 20. The barometric leg 20 during the operation of the drum filter operates in the conventional manner to drain filtrate from internally of the drum 10 and creates and applies a subatmospheric pressure or vacuum internally of the drum 10.

The drum 10 is constructed to include two axially spaced, aligned cylindrical drum sections 24, each located adjacent an end of the drum 10, spaced one from the other by an annular space or channel designated generally at 26 which is adjacent the longitudinal mid-point of the drum 10. The drum sections 24 are connected to one another by suitable conventional internal bracing elements 25 to be conjointly rotatable and at their adjacent ends carry opposed cover plates 28, 30 spaced by a relatively narrow annular slot or space 36. The drum sections 24 each peripherally carry an annular winding wire 34 having an annular filter screen 32 peripherally therearound. The drum sections 24 each contain a plurality of series of generally longitudinally extending filtrate compartments 38 adjacent their periphery. The filtrate compartments 38 are each bonded along their inner bottom by a bottom wall or floor 40, along their outer top by a winding wire 34, and on their opposing sides by circumferentially spaced side walls or ribs 42 extending generally longitudinally of the drum 10. The filtrate compartments 38 are arranged around the entire periphery of each of the drum sections 24; and the compartments 38 of each drum section 24 co-operate to form an annular volume peripherally around the latter throughout the length thereof. The filtrate compartments 38 for each drum section 24 have open ends 44 adjacent the annular space 26 and (except as prevented by the valving assembly 46 to be hereinafter described) communicate therethrough with the interior of the drum 10 whereby the subatmospheric pressure applied internally of the drum 10 is applied to the filtrate compartments 38 through the open ends 44 and filtrate is drained from such compartments 38 through the open ends 44. This arrangement, as will be understood, disposes the open ends 44 of the filtrate compartments 38 of each of the drum sections 24 generally side-by-side to form an annular band of the open ends 44 peripherally around the drum 10 adjacent each side of the space 26, and resultantly arranges said bands of open ends 44 in opposed spaced relationship. The open ends 44 form the sole communication between the filtrate compartments 38 of each drum section 24 with the interior of the drum 10; and the bottom walls 40 of the compartment 38 of each drum section 24 are preferably formed by a single annular element arranged to slope downwardly towards the open ends 44 for facilitating drainage therethrough.

The arcuate valving assembly 46 is located in the annular space 26 intermediate the bands of open ends 44 for cutting off the subatmospheric pressure from the filtrate compartments 38 during the arcuate filter cake discharge and initial submergence portions of the rotary filter cycle of the filter. (It will be understood that, although not shown, a similar arrangement could be provided for cutting off the subatmospheric pressure during a washing portion of the filter cycle in the event that the filter be provided with such a washing portion.) The valving assembly 46 surrounds the drum 10 for approximately 105 degrees (i.e. as viewed in FIG. 2, from about the two o'clock position to about the five o'clock position) and is held nonrotatable or stationary, but arranged to slidably engage the drum 10 and seal the open ends 44 during such portion of the drum rotation.

More particularly, the valving assembly 46 is constructed to include spaced, arcuate inner bottom and outer top walls 48, 50, respectively, both of which are concentric with the cover plates 28, 30 and extend uninterrupted throughout the aforesaid length of the valving assembly 46. The top wall 50 is spaced from the cover plates 28, 30 by an arcuate space 52 which is applied the subatmospheric pressure such that balanced pressures are exerted on the remote faces of the walls 48, 50. The valving assembly 46 is, as illustrated, held against rotation solely externally of the drum and in the manner described in the beforementioned U.S. Pat. No. 3,327,863, but alternatively could be so held by an arrangement internally of the drum 10 as described in U.S. Pat. No. 3,327,862. As illustrated, the valving assembly 46 is held nonrotatable by a fixedly mounted bracket 54 which is connected to the valving assembly 46 by a plate designated generally as 56 disposed through the slot 36 and keyed to the outer wall 50. The plate 56 is, of course, of suitable cross sectional width to permit rotation of the drum 10 relative thereto. An annular sealing band 57 is arranged circumferentially over the cover plates 28, 30 for rotation with the drum 10, such sealing band 57 being constructed of resilient rubber-like material and serving to seal the slot 36 throughout the length thereof not closed by the plate 56.

The walls 48, 50 of the valving assembly 46 are connected at their adjacent ends by suitable end closure walls which close the opposing ends of the valve cavity or chamber 58 between the walls 48, 50. The arcuate sides of the valve chamber 58 are bonded by arcuately extending outer side closure walls or plates 60 which have inner side walls or plates 62 extending arcuately along their adjacent faces throughout their lengths.

Intermediate each of the outer side walls 60 and the thereadjacent band of open ends 44, the valving assembly 46 includes a closure wall adapted for slidably engaging the drum 10 and closing such open ends 44 from communication with the barometric leg 20. These closure walls, as will be seen from FIG. 2 wherein one thereof has been shown for the purposes of illustration, each comprise three arcuately contoured plate or wall elements 64 snugly abutting end-to-end and together extending the total arcuate length of the valving assembly 46. The elements 64, hence, extend transversely to their respective adjacent open ends 44 and each include a side 66 arranged to slidably engage the thereadjacent ends 72 of the respective bottom walls 40, the thereadjacent ends of the ribs 42 and a thereadjacent annular rotating component 70 of the drum 10 for providing said closing of the open ends 44, and also include a side 68 opposing an outer side wall 60. The elements 64, as shown in FIG. 3, each extend radially a distance greater than the radial dimension of the open ends 44; and the radially inner edge or surface 74 of each of the elements 64 is slidably received in an annular track or way 76 formed in the ends 72 of the adjacent bottom walls 40.

The elements 64 are each mounted on their adjacent inner side wall 62 by retaining means which, as illustrated, comprises a plurality of mounting bolts 78 arranged at locations spaced along the arcuate lengths of the elements 64. This mounting of the elements 64, as best shown in FIG. 3, is such that the elements 64 are each limitedly laterally movable towards-and-away from the respective adjacent rotating elements 40, 42, 70 and open ends 44 between a position wherein the side 66 slidably sealingly engages such rotating elements and a position wherein the side 66 is out of such sealing engagement. The elements 64, as illustrated, are biased to their positions wherein the sides 66 so sealingly engage by individual, resilient, rubber endless biasing elements or rings 80 located intermediate the element sides 68 and the outer side walls 60. These biasing rings 80 are located in ring grooves 86 which are formed in such side faces 68 to cause the rings 80 to extend adjacent the peripheries of the elements 64 and longitudinally throughout substantially the lengths of the elements 64.

The elements 64 include openings 82 which communicate through aligned openings formed in the inner and outer side walls 60, 62 with the valve chamber 58. The openings 82 are particularly arranged to communicate the open ends 44 of compartments 38 being initially submerged through the valve chamber 58 with the open ends 44 of filtrate compartments 38 which have had the overlying filter cake removed but are not yet submerged. In this manner air is permitted to escape from the compartments 38 during their initial submergence and passes through the valve chamber 58 to said compartments 38 not yet submerged. The uppermost or, as viewed in FIG. 2, most counterclockwise and lowermost or, again as viewed in FIG. 2, most clockwise ends of the walls formed by the elements 64 are, however, imperforate. The takeoff doctor for the filter, designated generally as 84, is arranged to remove filter cake from the filter screen 32 opposite the aforementioned imperforate uppermost ends of the walls formed by the elements 64.

Figure 2:
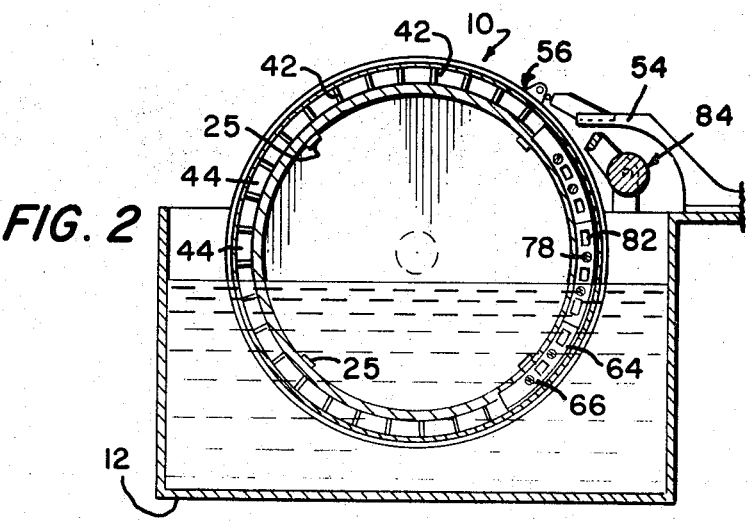
FIG. 2 is an elevational sectional view of the filter taken on line 2—2 of FIG. 1, looking in the direction of the arrows.
Figure 4:
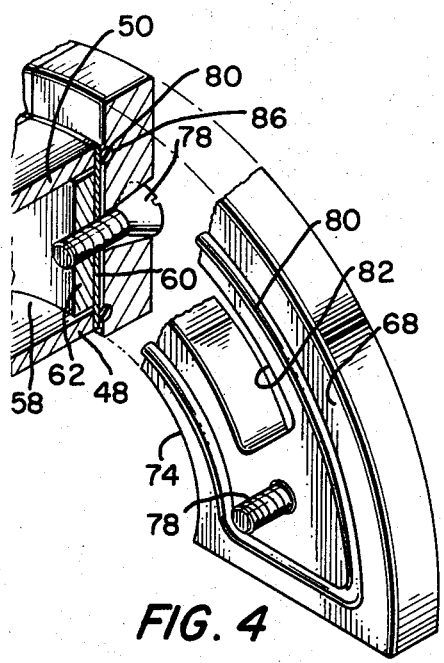
FIG. 4 is a fragmentary view in perspective of said valving assembly taken on line 4—4 of FIG. 3, looking in the direction of the arrows.
Figure 3:
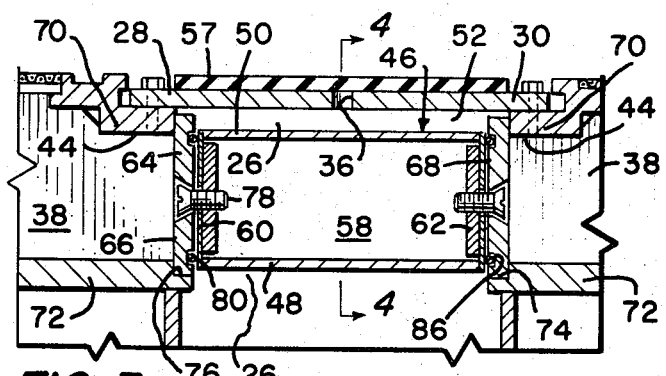
FIG. 3 is an enlarged, fragmentary elevational sectional view showing a portion of the valving assembly of the filter in combination with thereadjacent portions of the filter drum.

In the operation of the aforedescribed filter the drum 10 is rotatably driven in a clockwise direction, as viewed in FIG. 2, to successively drive the filtrate compartments 38 under the level of the slurry in the vat 12 for filter cake accretion and then above such level for drying of the cake and removal of the accumulated filter cake from the screen 32. During the initial submergence of the filtrate compartments 38 into the slurry in the vat 12 filter cake accretion is effected without the assistance of the subatmospheric pressure as the elements 64 close the open ends 44 from communication with the barometric leg 20. Air in the initially submerging filtrate compartments 38, however, is permitted to evacuate or escape through the valve chamber 58 in the aforedescribed manner. Below the lowermost end of the walls formed by the elements 64, subatmospheric pressure is applied to the compartments 38 through the open ends 44. Thus, additional filter cake is accumulated on the screen 32 due to the subatmospheric pressure; and the subatmospheric pressure continues to be applied until the compartments 38 rotate to the uppermost ends of the walls by the elements 64. At this location communication between the barometric leg 20 and the compartments 38 is cut off by the elements 64 and the accumulated filter cake is removed from the drum 10 by the doctor 84. The biasing rings 80 maintain the elements 64 sealingly in engagement with the rotating elements 40, 42, 70 throughout the length of the valving assembly 46, and as a result communication of the open ends 44 with the barometric leg 20 and air leakage around the inner and outer edges of the elements 64 to the barometric leg 20 are thereby prevented throughout the length of the valving assembly 64.

From the preceding description it will be seen that I have provided new and improved means for accomplishing the objects and advantages of my invention. It will, however, be understood that, although I have illustrated and hereinbefore specifically described only a single embodiment of my invention, the invention is not limited merely to this single embodiment but rather contemplates other embodiments and variations.

I claim:

1. A rotary drum filter having a rotary filter cycle including an arcuate portion during which subatmospheric pressure is applied for filter cake accretion and an arcuate portion during which the subatmospheric pressure is cut off, said filter comprising a rotatable drum having peripheral filtrate compartments which extend generally longitudinally of said drum and co-operate to form an annular volume peripherally around said drum, said filtrate compartments having open ends through which the subatmospheric pressure is applied to said compartments and through which filtrate is drained from said compartments, such open ends being arranged to form a band of the open ends peripherally around said drum, stationary means held against rotation for controlling the application of subatmospheric pressure to said compartments through such open ends, said stationary means including a support and wall means extending along said band of open ends having a side thereadjacent for slidably sealingly engaging said drum at such open ends, means mounting said wall means on said support for limited lateral movement to a position in which said side of said wall means slidably sealingly engages said drum at such open ends, and means resiliently biasing said wall means to said position in which said side thereof slidably sealingly engages said drum.

2. A rotary drum filter according to claim 1, wherein said wall means comprising a plurality of arcuate plate elements arranged end-to-end.

3. A rotary drum filter according to claim 1, wherein said biasing means is located intermediate said support and said wall means.

4. A rotary drum filter having a rotary filter cycle including an arcuate portion during which subatmospheric pressure is applied for filter cake accretion and an arcuate portion during which the subatmospheric pressure is cut off, said filter comprising a rotatable drum having peripheral filtrate compartments which extend generally longitudinally of said drum and co-operate to form an annular volume peripherally around said drum, said filtrate compartments having open ends through which the subatmospheric pressure is applied to said compartments and through which filtrate is drained from said compartments, such open ends being arranged to form a band of the open ends peripherally around said drum, stationary means held against rotation for controlling the application of subatmospheric pressure to said compartments through such open ends, said stationary means including a stationary wall extending arcuately along said band of open ends and said stationary means also including an arcute closure element intermedite said stationary wall and said band of open ends, said arcuate element having a side opposing the band of open ends for slidably engaging said drum at such open ends, means mounting said arcuate element on said stationary wall for limited lateral movement between a position wherein said side thereof slidably sealingly engages said drum to close such open ends from the means applying the subatmospheric pressure and a position wherein said side is out of said sealing engagement with said drum, and a ring element intermediate said arcuate element and said stationary wall resiliently biasing said arcuate element to said position wherein said side sealingly engages said drum.

5. A rotary drum filter according to claim 4, wherein said arcuate element includes a ring groove opposite stationary wall, and said ring element is disposed in said groove.

6. A rotary drum filter according to claim 4, wherein said stationary means includes a second arcuate closure element positioned arcuately end-to-end with said arcuate element, said second arcuate element having a side opposing the band of open ends for slidably sealingly engaging the drum at such open ends, means mount said second arcuate element on said stationary wall for limited lateral movement between a position wherein said side thereof slidably sealingly engages said drum to close such open ends from the means applying the subatmospheric pressure and a position wherein its said side is out of said sealing engagement with said drum, and a second ring element interposed intermediate said second arcuate element and said stationary wall resiliently biases said second arcuate element to its position wherein its said side sealing engages said drum.

7. A rotary drum filter having a rotary filter cycle including an arcuate portion during which subatmospheric pressure is applied for filter cake accretion and an arcuate portion during which the subatmospheric pressure is cut off, said filter comprising a rotatable drum having a pair of axially spaced series of peripheral filtrate compartments which extend generally longitudinally of said drum and form annular volumes peripherally around said drum, said filtrate compartments having open ends located intermediate the ends of said drum through which the subatmospheric pressure is applied to said compartments and through which filtrate is drained from said compartments, the open ends of the compartments of each series being arranged generally side-by-side and forming a band of such open ends peripherally around said drum and said bands of open ends being arranged in opposed spaced relationship, stationary means held against rotation and intermediate said bands of open ends for controlling the application of subatmospheric pressure to said compartments through such open ends, said stationary means including a stationary wall extending arcuately along each of said bands of open ends in spaced relationship thereto and said stationary means also including an arcuately extending closure wall intermediate each of said stationary walls and the thereadjacent band of open ends, said closure walls each having a side opposing the thereadjacent band of open ends for slidably sealingly engaging said drum at such open ends to close such open ends from the means applying the subatmospheric pressure, means mounting said closure walls on the respective adjacent stationary wall for limited lateral movement towards-and-away from the respective adjacent band of open ends, and ring means intermediate each closure wall and the adjacent stationary wall resiliently biasing said closure walls to cause said sides thereof to so slidably sealingly engage said drum.

8. A rotary drum filter according to claim 7, wherein each of said closure walls comprises a plurality of arcuate closure elements arranged end-to-end, said mounting means comprises retaining means at locations spaced along the lengths of said closure elements, and said ring means comprises individual biasing rings for each of said closure elements.

9. A rotary drum filter according to claim 8, wherein said arcuate closure elements each include a groove opposite the adjacent stationary wall and said biasing rings are positioned in said grooves.

References Cited
UNITED STATES PATENTS

| | | | |
|---|---|---|---|
| 3,306,460 | 2/1967 | Luthi | 210—404 |
| 3,327,862 | 6/1967 | Carlsmith | 210—392 |

REUBEN FRIEDMAN, Primary Examiner

T. A. GRANGER, Assistant Examiner